US012549503B2

(12) United States Patent
Li et al.

(10) Patent No.: US 12,549,503 B2
(45) Date of Patent: Feb. 10, 2026

(54) INFORMATION INTERACTION METHOD AND APPARATUS, AND ELECTRONIC DEVICE

(71) Applicant: Beijing Zitiao Network Technology Co., Ltd., Beijing (CN)

(72) Inventors: Zhiqin Li, Beijing (CN); Hongye Qi, Beijing (CN); He Zhao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/383,839

(22) Filed: Oct. 25, 2023

(65) Prior Publication Data

US 2024/0056407 A1 Feb. 15, 2024

Related U.S. Application Data

(63) Continuation of application No. PCT/CN2022/086375, filed on Apr. 12, 2022.

(30) Foreign Application Priority Data

Apr. 25, 2021 (CN) .......................... 202110450794.1

(51) Int. Cl.
*H04L 51/08* (2022.01)
*G06F 3/14* (2006.01)
(52) U.S. Cl.
CPC ............ *H04L 51/08* (2013.01); *G06F 3/1407* (2013.01)
(58) Field of Classification Search
CPC ................................ H04L 51/08; G06F 3/1407
USPC ........................................................ 715/752
See application file for complete search history.

(56) References Cited

U.S. PATENT DOCUMENTS

| 6,665,860 | B1 | 12/2003 | Desantis et al. |
| 7,263,526 | B1 * | 8/2007 | Busey .................. H04L 69/329 709/227 |
| 7,661,067 | B2 * | 2/2010 | Chen .................. H04L 12/1822 715/752 |

(Continued)

FOREIGN PATENT DOCUMENTS

| CN | 102075448 A | 5/2011 |
| CN | 102495866 A | 6/2012 |

(Continued)

OTHER PUBLICATIONS

International Patent Application No. PCT/CN2022/086375; Int'l Written Opinion and Search Report; dated Jul. 1, 2022; 6 pages.

(Continued)

*Primary Examiner* — Mohammed H Zuberi
*Assistant Examiner* — Ahamed I Nazar
(74) *Attorney, Agent, or Firm* — BakerHostetler

(57) ABSTRACT

An information interaction method is provided, including: displaying first service data in a first display region of a first service interface; displaying second service data in a second display region of the first service interface, wherein the second service data is data related to a second service and displayed in a second service interface; and updating, in response to receiving first feedback information with respect to the second service data displayed in the second display area via the first service interface, updating the second service interface based on the first feedback information received via the first service interface.

16 Claims, 10 Drawing Sheets

(56) References Cited

U.S. PATENT DOCUMENTS

| | | | |
|---|---|---|---|
| 2010/0131848 A1 | 5/2010 | Friedlander et al. | |
| 2010/0199187 A1 | 8/2010 | Lin et al. | |
| 2010/0217837 A1 | 8/2010 | Ansari et al. | |
| 2011/0252355 A1 | 10/2011 | Nixon et al. | |
| 2013/0067342 A1 | 3/2013 | Groves et al. | |
| 2013/0219303 A1 | 8/2013 | Eriksson et al. | |
| 2015/0127603 A1* | 5/2015 | Cohen | G06Q 10/101 707/608 |
| 2015/0172238 A1 | 6/2015 | Ahmed et al. | |
| 2015/0277682 A1 | 10/2015 | Kaufthal et al. | |
| 2017/0147185 A1* | 5/2017 | Milvaney | G06F 3/04842 |
| 2017/0336959 A1* | 11/2017 | Chaudhri | G06F 3/0485 |
| 2019/0288965 A1 | 9/2019 | Qiu et al. | |
| 2020/0045519 A1 | 2/2020 | Raleigh et al. | |
| 2020/0236074 A1* | 7/2020 | Kim | H04L 51/046 |
| 2021/0152503 A1* | 5/2021 | Rodriguez | H04L 51/04 |
| 2022/0004403 A1* | 1/2022 | Lew | H04L 51/18 |

FOREIGN PATENT DOCUMENTS

| | | |
|---|---|---|
| CN | 105264516 A | 1/2016 |
| CN | 105868276 A | 8/2016 |
| CN | 106293319 A | 1/2017 |
| CN | 106303067 A | 1/2017 |
| CN | 107424033 A | 12/2017 |
| CN | 107861982 A | 3/2018 |
| CN | 108809800 A | 11/2018 |
| CN | 109379271 A | 2/2019 |
| CN | 110069305 A | 7/2019 |
| CN | 110231910 A | 9/2019 |
| CN | 110709869 A | 1/2020 |
| CN | 110807136 A | 2/2020 |
| CN | 111052160 A | 4/2020 |
| CN | 111144074 A | 5/2020 |
| CN | 111694620 A | 9/2020 |
| CN | 111694629 A | 9/2020 |
| CN | 111880858 A | 11/2020 |
| CN | 111934975 A | 11/2020 |
| CN | 112286340 A | 1/2021 |
| CN | 112632299 A | 4/2021 |
| CN | 113157153 A | 7/2021 |
| CN | 115248642 B | 10/2024 |
| JP | 2001142830 A | 5/2001 |
| JP | 2001209521 A | 8/2001 |
| JP | 2011113495 A | 6/2011 |
| JP | 2017084366 A | 5/2017 |
| JP | 2018518769 A | 7/2018 |
| JP | 2019164743 A | 9/2019 |
| JP | 2019185620 A | 10/2019 |
| JP | 2020510929 A | 4/2020 |
| WO | WO 2013/086903 A1 | 6/2013 |
| WO | WO 2017/161743 A1 | 9/2017 |
| WO | WO 2018/155976 A1 | 8/2018 |
| WO | WO 2020/228561 A1 | 11/2020 |

OTHER PUBLICATIONS

International Patent Application No. PCT/CN2022/089122; Int'l Written Opinion and Search Report; dated Jul. 20, 2022; 8 pages.

Lu et al.; "Research on Implementing Instant Message Platform of Enterprise Based on P2P Technology"; Jisuanji Yu Xianda Hua; vol. 142; Jun. 2007; p. 67-73 (contains English Abstract).

Liu Shujun; "The Design of E-commerce Exchange Platform Based on Web Database"; Information Science; vol. 21 No. 6; Jun. 2003; p. 648-650 (contains English Abstract).

Jiang Ying et al.; "Least Squares Method-Based Quantitative Modeling on Visual Comfort for VDT display Interface"; Int'l Journal of Advanced Manufacturing Technology; Issue 1; Dec. 2016; 11 pages (Abstract Only).

Bo Cheng et al.; "A Web Services Discovery Approach Based on Mining Underlying Interface Semantics"; IEEE Transactions on Knowledge and Data Engineering; vol. 29; Dec. 2016; p. 950-962 (Abstract Only).

European Patent Application No. 22794585.4; Extended Search Report; dated Sep. 13, 2024; 14 pages.

"How to easily exchange data among .NET applications"; https://web.archive.org/web/20160810161225/http://www.codeproject.com/Articles/96675/How-to-easily-exchange-data-among-NET-applications; Code Project; Jul. 2010; accessed Jul. 19, 2024; 6 pages.

European Patent Application No. 22794875.9; Extended Search Report; dated Jul. 31, 2024; 10 pages.

Notice of Reasons for Refusal for Japanese Application No. 2023-565162, mailed Nov. 12, 2024, 9 pages.

Notice of Reasons for Refusal for Japanese Application No. 2023-565351, mailed Oct. 29, 2024, 8 pages.

Communication pursuant to Rules 70(2) and 70a(2) EPC for European Application No. 22794585.4, mailed Oct. 1, 2024, 1 page.

Shouchun Z., et al., "A Brief Analysis on the Selection and Implementation of Practical Course Case Studies—Taking the Course 'Animation Audio and Video Processing' as an Example," Journal of Jiangxi Electric Power Vocational and Technical College, Jun. 28, 2020, No. 06, 4 pages with English Abstract.

* cited by examiner

INFORMATION INTERACTION METHOD AND APPARATUS, AND ELECTRONIC DEVICE

CROSS REFERENCE OF RELATED APPLICATION

The present application is a continuation application of International Patent Application No. PCT/CN2022/086375, titled "INFORMATION INTERACTION METHOD AND APPARATUS, AND ELECTRONIC DEVICE", filed on Apr. 12, 2022, which claims priority to Chinese Patent Application No. 202110450794.1, titled "INFORMATION INTERACTION METHOD AND APPARATUS, AND ELECTRONIC DEVICE", filed on Apr. 25, 2021 with the China National Intellectual Property Administration, both of which are incorporated herein by reference in their entireties.

FIELD

The present disclosure relates to the field of internet technology, in particular to an information interaction method, an information interaction apparatus, and an electronic device.

BACKGROUND

With the development of the internet, more and more users use terminal devices to achieve various functions. For example, users can use instant messaging applications to perform instant communications, and use online document applications to achieve collaborative communication.

SUMMARY

This summary is provided to introduce concepts in a simplified form. These concepts will be described in detail in the following detailed description. This summary is neither intended to identify key features or essential features of the claimed technical solution, nor intended to limit the scope of the claimed technical solution.

In a first aspect, an information interaction method is provided according to embodiments of the present disclosure, including: displaying first service data in a first display area of a first service interface; displaying second service data in a second display area of the first service interface, wherein the second service data is data related to a second service and displayed on a second service interface; and updating, in response to receiving first feedback information with respect to the second service data displayed in the second display area via the first service interface, updating the second service interface based on the first feedback information received via the first service interface.

In a second aspect, an information interaction apparatus is provided according to embodiments of the present disclosure, including: a first display unit, configured to display first service data in a first display area of a first service interface; a second display unit, configured to display second service data in a second display area of the first service interface, wherein the second service data is data related to a second service and displayed on a second service interface; and an update unit, configured to update, in response to receiving first feedback information with respect to the second service data displayed in the second display area via the first service interface, updating the second service interface based on the first feedback information received via the first service interface.

In a third aspect, an electronic device is provided according to embodiments of the present disclosure, including: one or more processors; and a memory configured to store one or more programs, where the one or more programs, when being executed by the one or more processors, cause the one or more processors to perform the method according to the first aspect.

In a fourth aspect, a computer-readable storage medium is provided according to embodiments of the present disclosure, storing a computer program, where the program, when being executed by a processor, causes the processor to perform the method according to the first aspect.

With the information interaction method, the information interaction apparatus and the electronic device provided in embodiments of the present disclosure, the first service data is displayed in the first display area of the first service interface and the second service data is displayed in the second display area of the first service interface. Then, in the first service interface, the first feedback information for the displayed second service interface is received, and then the second service interface is updated based on the first feedback information. In this way, the second service data inputted in the first service interface is fed to the second service interface, thereby saving the steps of jumping to the second service interface and inputting the feedback information, reducing the number of user operations, and improving information transmission efficiency.

BRIEF DESCRIPTION OF THE DRAWINGS

The above and other features, advantages and aspects of the various embodiments of the present disclosure will become more apparent with reference to the following detailed description in conjunction with the drawings. Throughout the drawings, the same or similar reference numerals denote the same or similar elements. It should be understood that the drawings are schematic and that components and elements are not necessarily drawn to scale.

DETAILED DESCRIPTION

Figure 1:
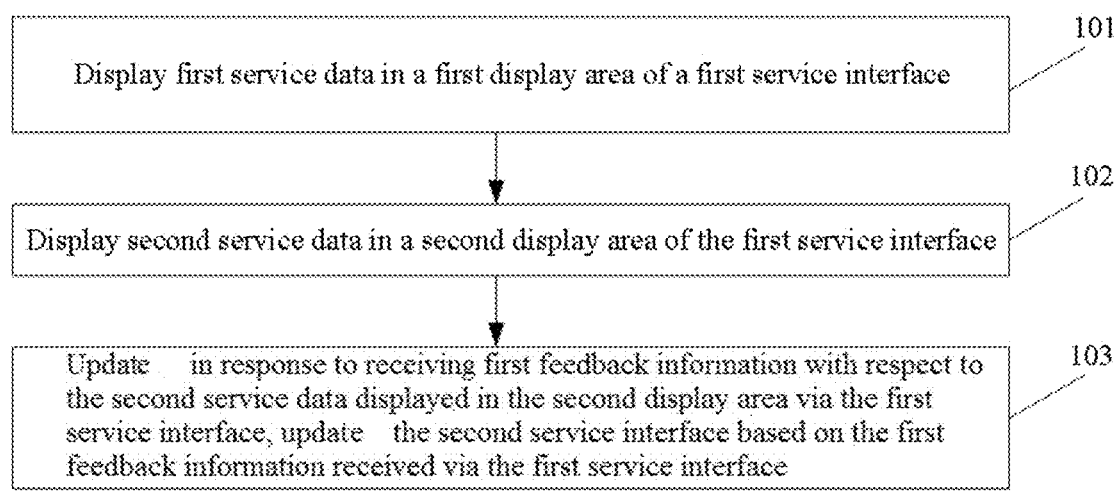
FIG. 1 is a flowchart of an information interaction method according to an embodiment of the present disclosure.

Embodiments of the present disclosure will be described in more detail below with reference to the drawings.

Although some embodiments of the present disclosure are shown in the drawings, it should be understood that the present disclosure may be embodied in various forms and should not be construed as limited to the embodiments set forth herein. Instead, these embodiments are provided so that the understanding of the present disclosure can be thorough and complete. It should be understood that the drawings and embodiments of the present disclosure are for illustrative purposes only, and are not intended to limit the protection scope of the present disclosure.

It should be understood that the various steps described in the method embodiments of the present disclosure may be performed in different orders, and/or performed in parallel. Additionally, method embodiments may include additional steps and/or illustrated steps may be not performed. The scope of the present disclosure is not limited in this regard.

The term "comprising" and its variations herein are non-exclusive, i.e., "including but not limited to". The term "based on" means "based at least in part on". The term "one embodiment" means "at least one embodiment." The term "another embodiment" means "at least one further embodiment". The term "some embodiments" means "at least some embodiments". Relevant definitions of other terms will be given in the description below.

It should be noted that concepts such as "first" and "second" mentioned herein are only for distinguishing different devices, modules or units, rather than limiting the sequence or interdependence of functions performed by these devices, modules or units.

It should be noted that the determiners of "a" and "a plurality" mentioned in the present disclosure are illustrative but not restrictive. Those skilled in the art should understand that, unless the context clearly indicates otherwise, such determiners should be understood as "one or more".

The names of messages or information exchanged between multiple devices in the embodiments of the present disclosure are used for illustrative purposes only, and are not used to limit the scope of these messages or information.

Reference is made to FIG. 1, which illustrates a flowchart of an information interaction method according to an embodiment of the present disclosure. The information interaction method shown in FIG. 1 includes the following steps S101 to S103.

In step 101, first service data is displayed in a first display area of a first service interface.

In this embodiment, a service interface is used to display service related information. Different services can be predefined. It can be understood that first or second service mentioned in the present disclosure is only for the convenience of description and does not constitute a limitation on the service.

In some application scenarios, an application may include multiple services. For example, an office application may include at least one of, but not limited to, an instant messaging service, an email service, an online document service, a multimedia conference service, and a calendar service. The application can be of any type, which is not limited herein. For example, the application may be an instant messaging application, a video playback application, or an email application.

In some application scenarios, the different services may be different applications. For example, an online document application and an instant messaging application can serve as different services.

In this embodiment, the first service data is data related to a first service.

In step 102, second service data is displayed in a second display area of the first service interface.

In this embodiment, the second service data is data related to a second service and displayed on a second service interface.

In step 103, in response to receiving first feedback information for the second service data displayed in the second display area in the first service interface, the second service interface is updated based on the first feedback information.

In some application scenarios, the updating the second service interface based on the first feedback information may include displaying the first feedback information on the second service interface, or changing a relevant parameter on the second service interface based on the first feedback information. For example, the first feedback information may include an emoticon (such as a thumb-up) replied to a conversation message. If there is already an emoticon of thumb-up for this conversation message in the second service interface, the total number of the emoticons of thumb-up may be added by 1.

FIGS. 2A, 2B, 2C, and 2D illustrate exemplary application scenarios of the above embodiment. As an example, in FIGS. 2A, 2B, 2C, and 2D, the first service is an online document service and the second service is an instant messaging service.

Figure 2A:
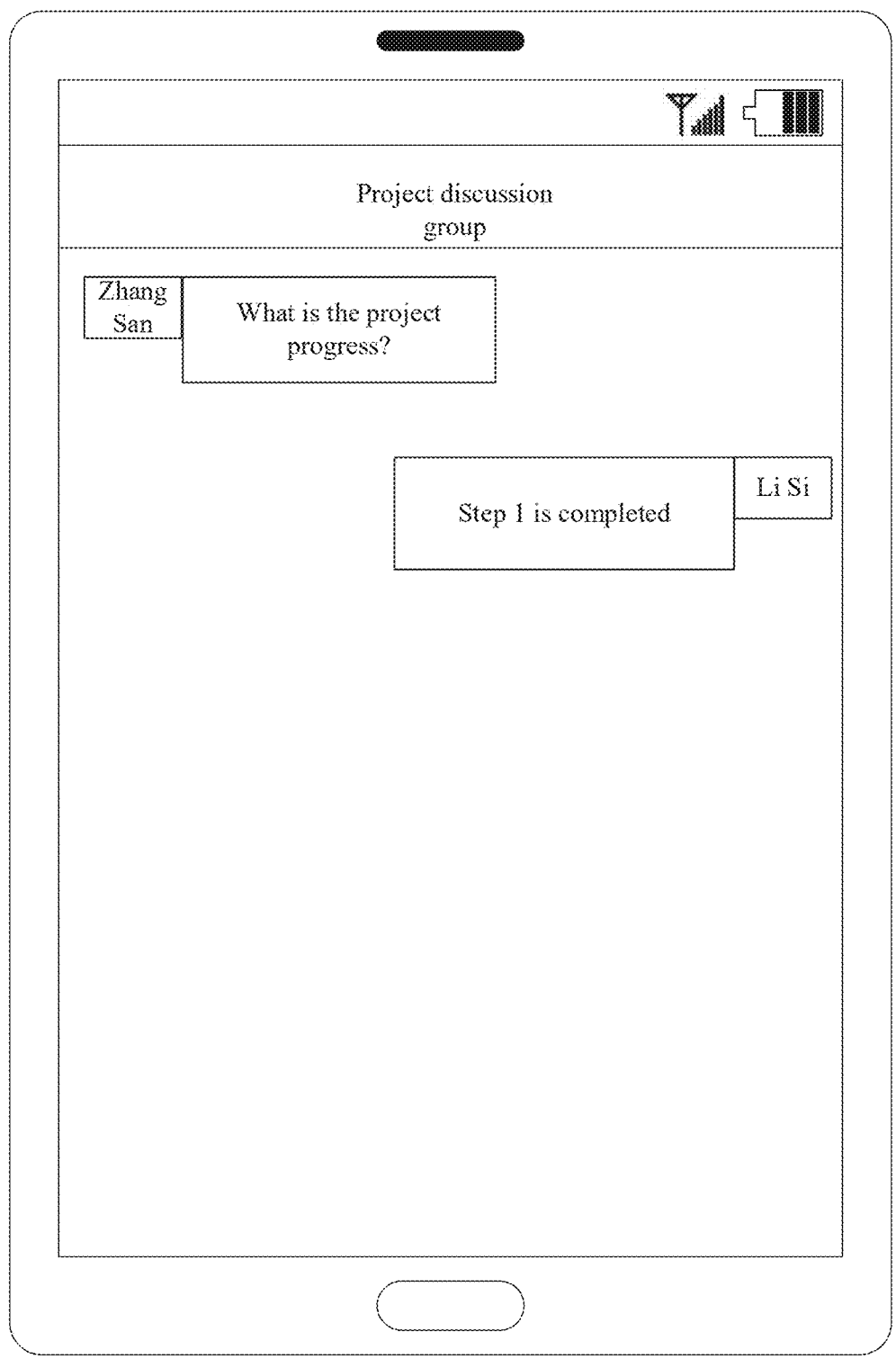
FIGS. 2A, 2B, 2C, and 2D are schematic diagrams of an application scenario of an information interaction method according to the present disclosure.

FIG. 2A shows an conversation interface of instant messaging. Optionally, conversation messages from the conversation interface of instant messaging can be shared to an online document. Here, any group member in a project discussion group can share the conversation messages to the online document.

Figure 2B:
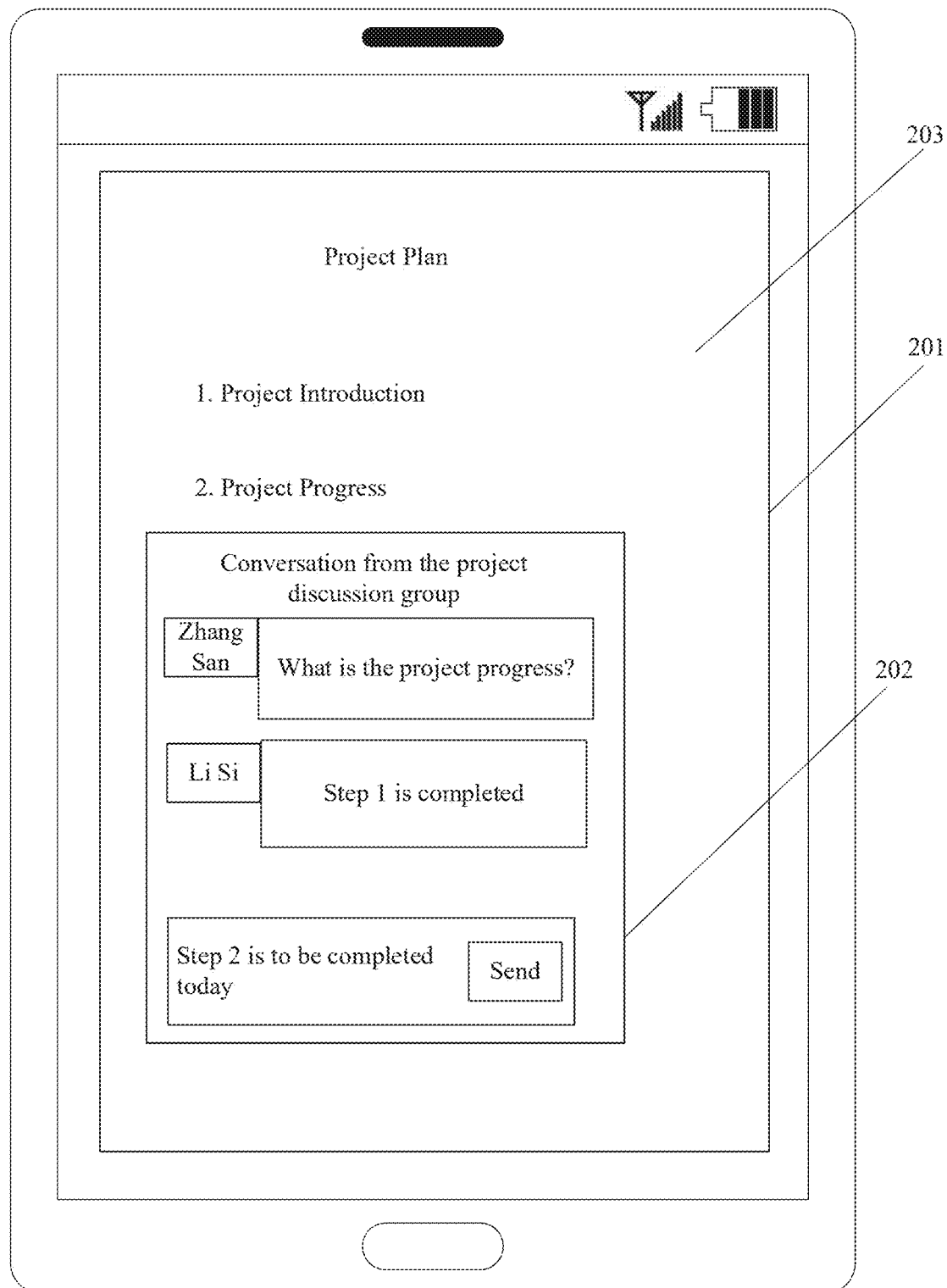
Figure 2C:
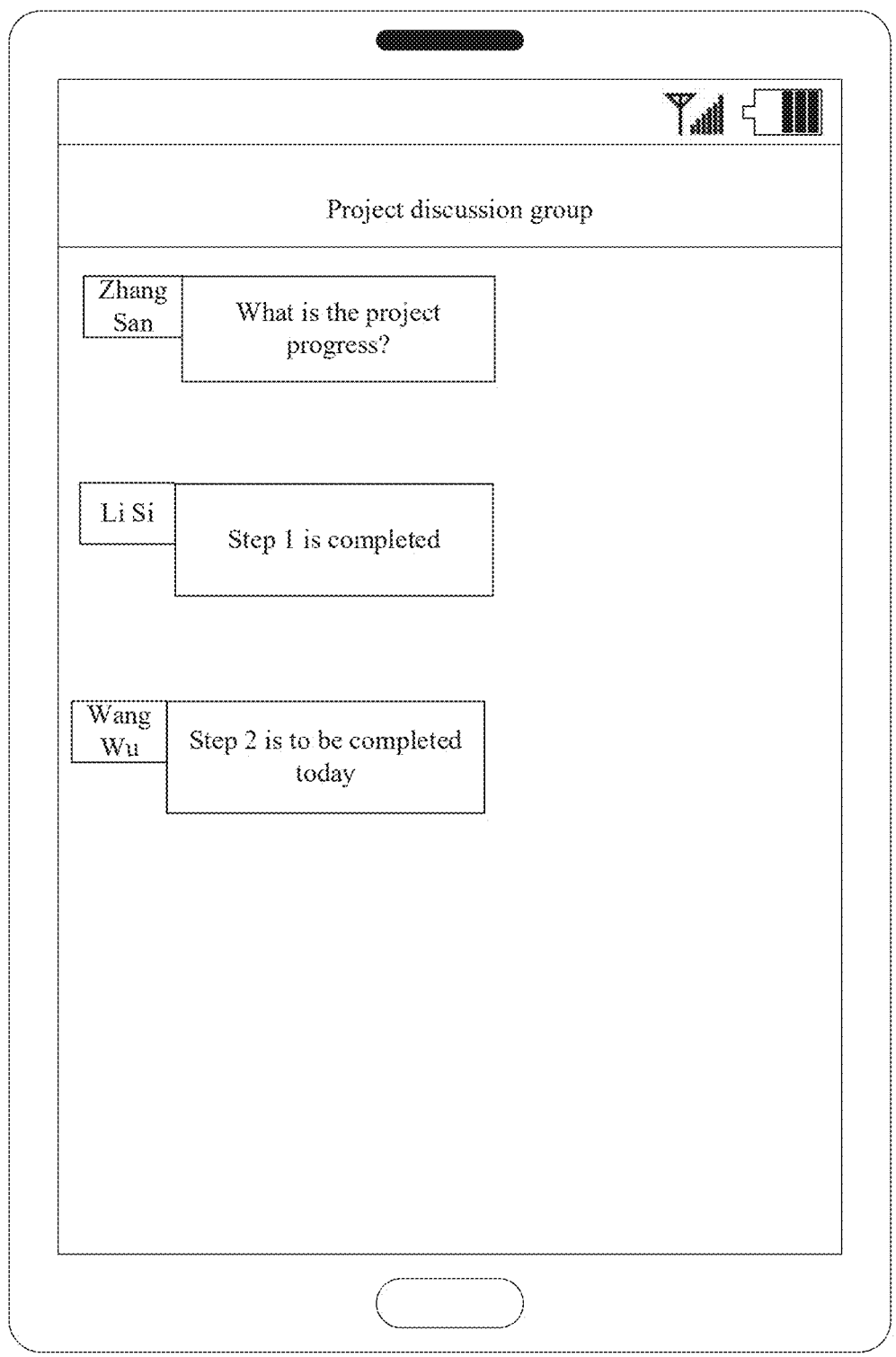

The online document interface is shown in FIG. 2B. The online document interface displays an online document "Project Plan". The first display area of the online document interface displays the title "Project Plan" and document content "1. Project Introduction" and "2. Project Progress". As an example, the portion of the online document interface 201 other than the second display area 202 may serve as the first display area 203.

The second display area 202 of the online document interface may be used to display the second service data. The second service data may be conversation messages of an instant messaging conversation. As an example, FIG. 2B shows the first service interface displayed after logging into the account of Wang Wu.

Wang Wu enters the first feedback information for the second service data in the first service interface. The first feedback information may include, for example, "Step 2 is to be completed today".

Then, the second service interface is updated based on the first feedback information. Referring to the second service interface shown in FIG. 2C, the second service interface displays the new message inputted by Wang Wu on the first service interface. The second service interface shown in FIG. 2C may be an interface displayed when any group member in the "project discussion group" opens a group conversation interface.

Figure 2D:
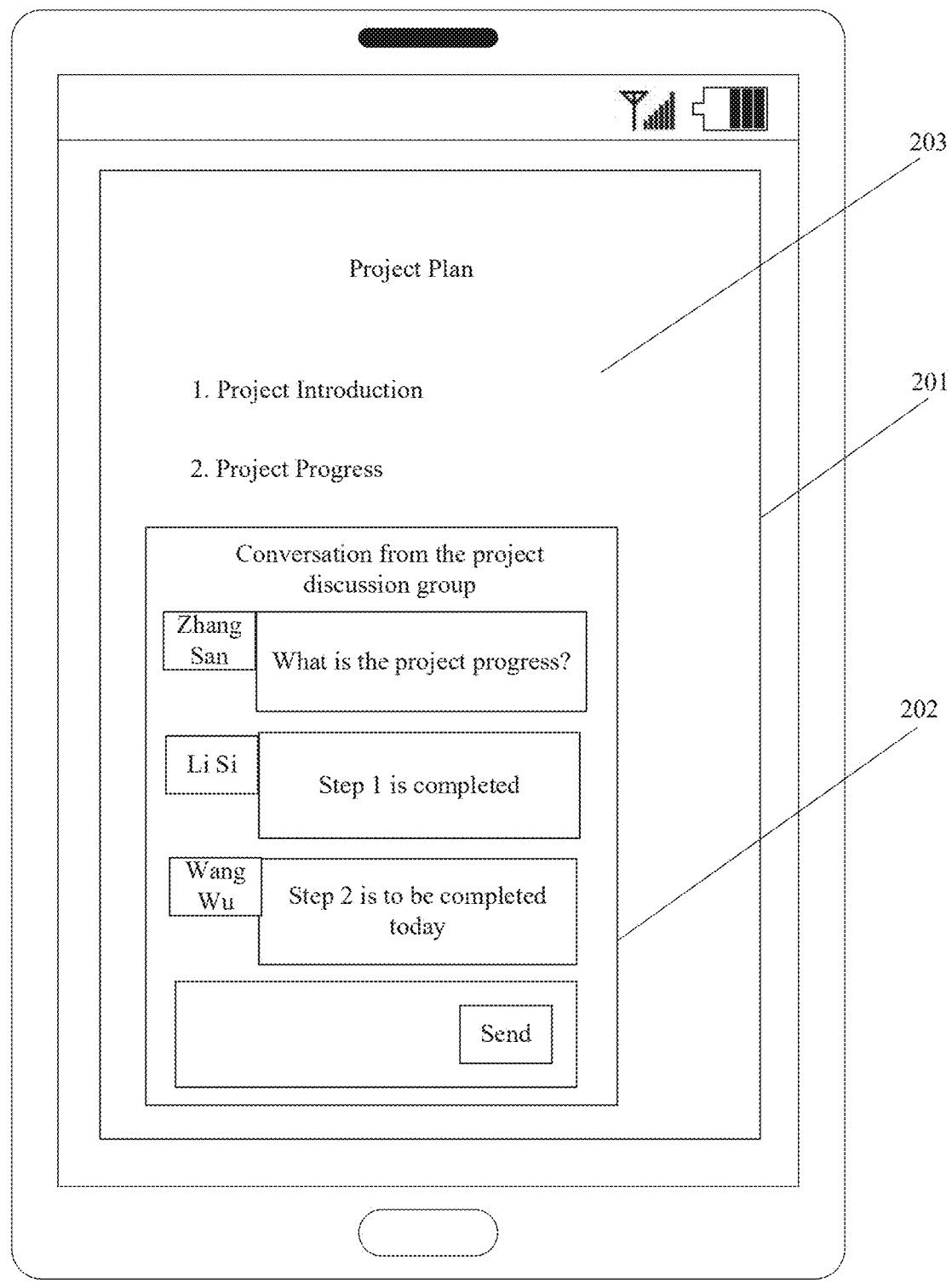

In addition, the first feedback information inputted by Wang Wu can also be displayed in the second display area of the first service interface, as shown in FIG. 2D. The second service interface shown in FIG. 2D may be an interface displayed when any user having a reading permission opens the online document.

It should be noted that in the information interaction method provided in this embodiment, the first service data is displayed in the first display area of the first service interface and the second service data is displayed in the second display area of the first service interface. Then, in the first service interface, the first feedback information for the displayed second service interface is received, and then the second service interface is updated based on the first feedback information. In this way, the second service data inputted in the first service interface is fed to the second service interface, thereby saving the steps of jumping to the second service interface and inputting the feedback information, reducing the number of user operations, and improving information transmission efficiency.

In some embodiments, the method further includes displaying the first feedback information in the second display area.

FIG. 2D shows that the first feedback information inputted by Wang Wu is displayed in the second display area.

It should be noted that timely updating the first feedback information to the first service interface can achieve presenting the second service data by using the first service interface, and thus achieving the accuracy and efficiency of information interaction based on the first service interface.

In some embodiments, the method further includes receiving the first feedback information in the second display area.

Here, the position for inputting the first feedback information is in the second display area.

It should be noted that, setting the position for inputting the first feedback information in the second display area is adaptive to the characteristics that the user inputs the feedback information for the second service, thereby achieving that the display area of the first feedback information is the same as the display area of the feedback target, reducing the difficulty of interface operations, and improving the efficiency of interface operations.

In some embodiments, a first information identifier is used to identify the second service data displayed in the second display area.

In some embodiments, the method further includes sending the first feedback information to a server.

The server may store the received first feedback information as second service data and the first information identifier in an associated manner. The storage in the associated manner can be understood as establishing an association relationship between the first feedback information and the first information identifier.

In this way, a basis for updating the second service data in both the first and second service interfaces is provided. Thus, when various clients pull the service data, accurate and consistent secondary service data can be displayed to any client.

In some embodiments, the first feedback information includes first type information, which is main information in the second service.

As an example, if the second service is an instant messaging service, the main information in the instant messaging service may include message contents of a conversation. That is, the first type information is the message content of the conversation.

The server stores in an associated manner the first information identifier and a second information identifier identifying the first type information in response to receiving the first type information.

If the server receives the first feedback information in the form of the first type information, the server stores the second information identifier identifying the first feedback information and the first information identifier in an associated manner.

In this way, the server can determine the association relationship between message contents through the association relationship between information identifiers. When sending the first feedback information to the second service interface, the server can accurately determine that the second service interface is the destination, and accurately determine the position for displaying the first feedback information in the second service interface.

In some embodiments, the first feedback information includes second type information, which is additional information to the main information in the second service.

In some embodiments, the additional information to the main information may include, but is not limited to, at least one of the following: comments, a replied emoticon. As an example, additional information may include an emoticon (such as a thumb-up) used for responding to a conversation message.

The server stores, in response to receiving the second type information, the second type information in the storage space corresponding to the first information identifier.

If the server receives the first feedback information in the form of the second type information, the server stores the second type information in the storage space corresponding to the first information identifier.

Therefore, the first feedback information can be used as a sub-content of the second service data indicated by the first information identifier to update the second service interface. Thus, additional information can be quickly fed back and the second service data that needs to be updated with additional information can be located accurately.

In some embodiments, the method further includes: displaying, in response to displaying the first feedback information on the second service interface and in response to receiving first update information on the second service interface, the first update information received on the second service interface in the second display area of the first service interface.

Figure 3:
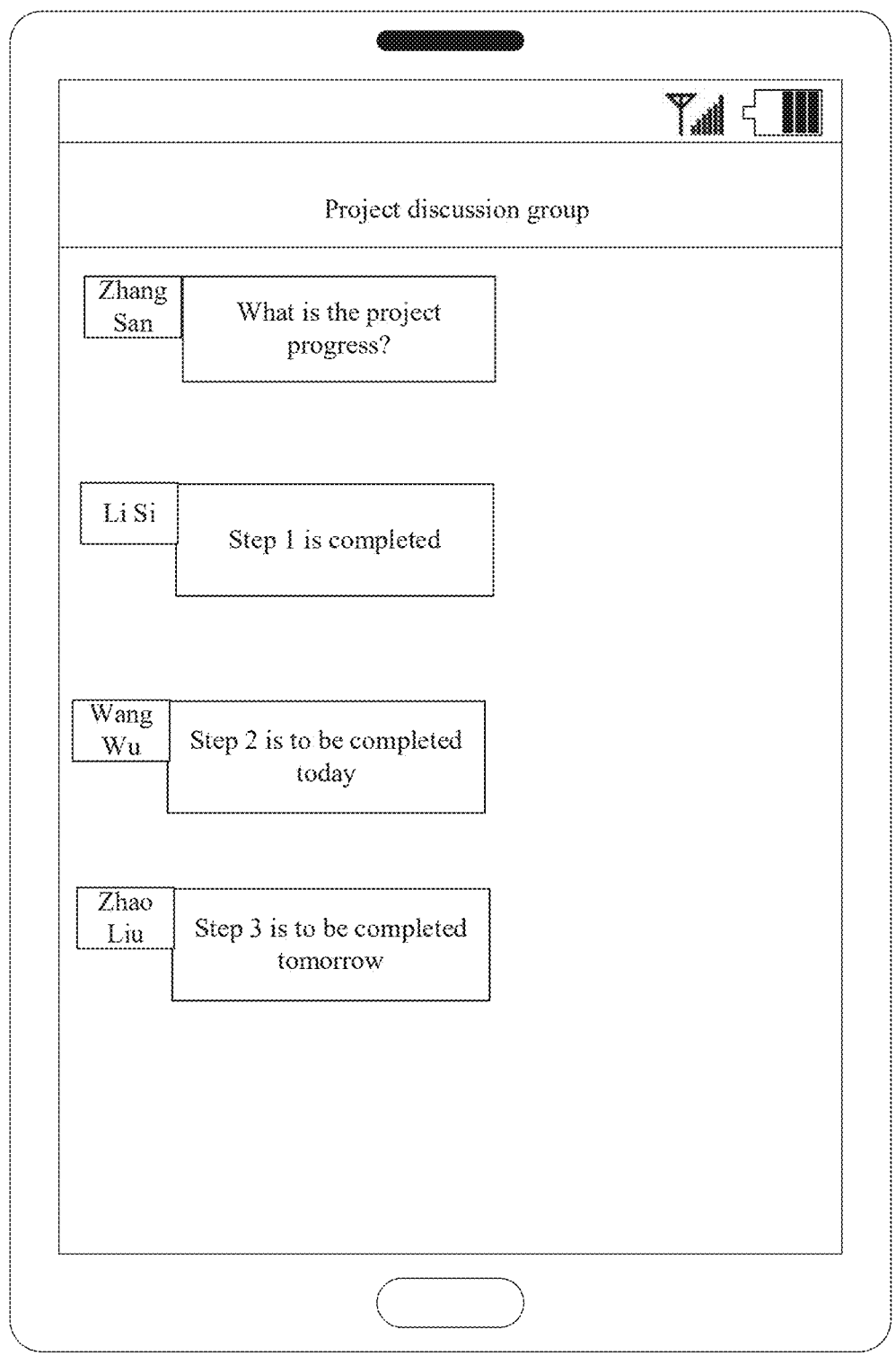
FIG. 3 is a schematic diagram of another application scenario of an information interaction method according to the present disclosure.

FIG. 3 shows that the first feedback message (the reply from Wang Wu) is displayed in the second service interface, and the message "Step 3 will be completed tomorrow" from Zhao Liu is received on the second service interface. After receiving the new message, the second service interface may send the new message to the first service interface. The first update information "Step 3 will be completed tomorrow" may be displayed in the second display area of the first service interface.

It should be noted that after the first service interface sends the first feedback information to the second service interface, the new message of the second service interface is updated to the first service interface. This can achieve that the first service interface is timely updated with the new message received by the second user interface in a case the user of the first service interface expects to interact with the user of the second service interface.

In some embodiments, the method further includes displaying, in response to displaying the first feedback information on the second service interface, the second feedback information received on the second service interface for the first feedback information in the second display area of the first service interface.

Figure 4:
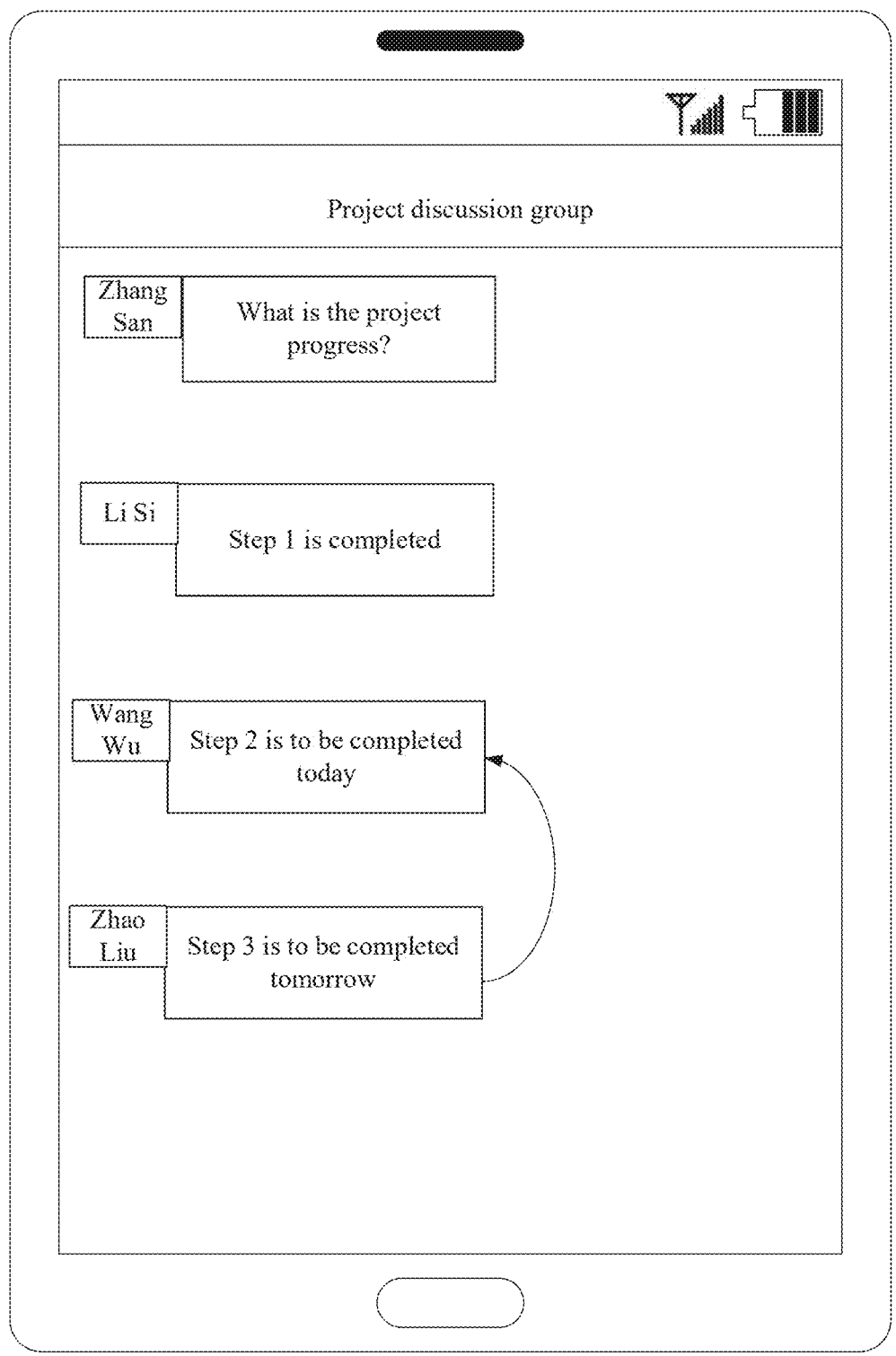
FIG. 4 is a schematic diagram of another application scenario of an information interaction method according to the present disclosure.

FIG. 4 shows the first feedback message (the reply from Wang Wu) displayed in the second service interface, and the second service interface receives a message "Step 3 will be completed tomorrow" from Zhao Liu, which is a message in response to the first feedback message (the reply from Wang Wu). The arrow in FIG. 4 points to the referenced message. In this case, the second display area of the first service interface can display the first update information "Step 3 will be completed tomorrow".

It should be noted that after the first service interface sends the first feedback information to the second service interface, if the new message received by the second service interface is in response to the first feedback information, the first service interface is updated with the new message, which can timely update first service interface with the new message responding to the first feedback information, so as to achieve targeted communication between the first and second services. In this way, the security of data in the second service interface is improved in the information interaction.

In some embodiments, the method further includes: in response to receiving third update information on the second service interface, displaying the third update information received on the second service interface in the second display area of the first service interface.

Figure 5:
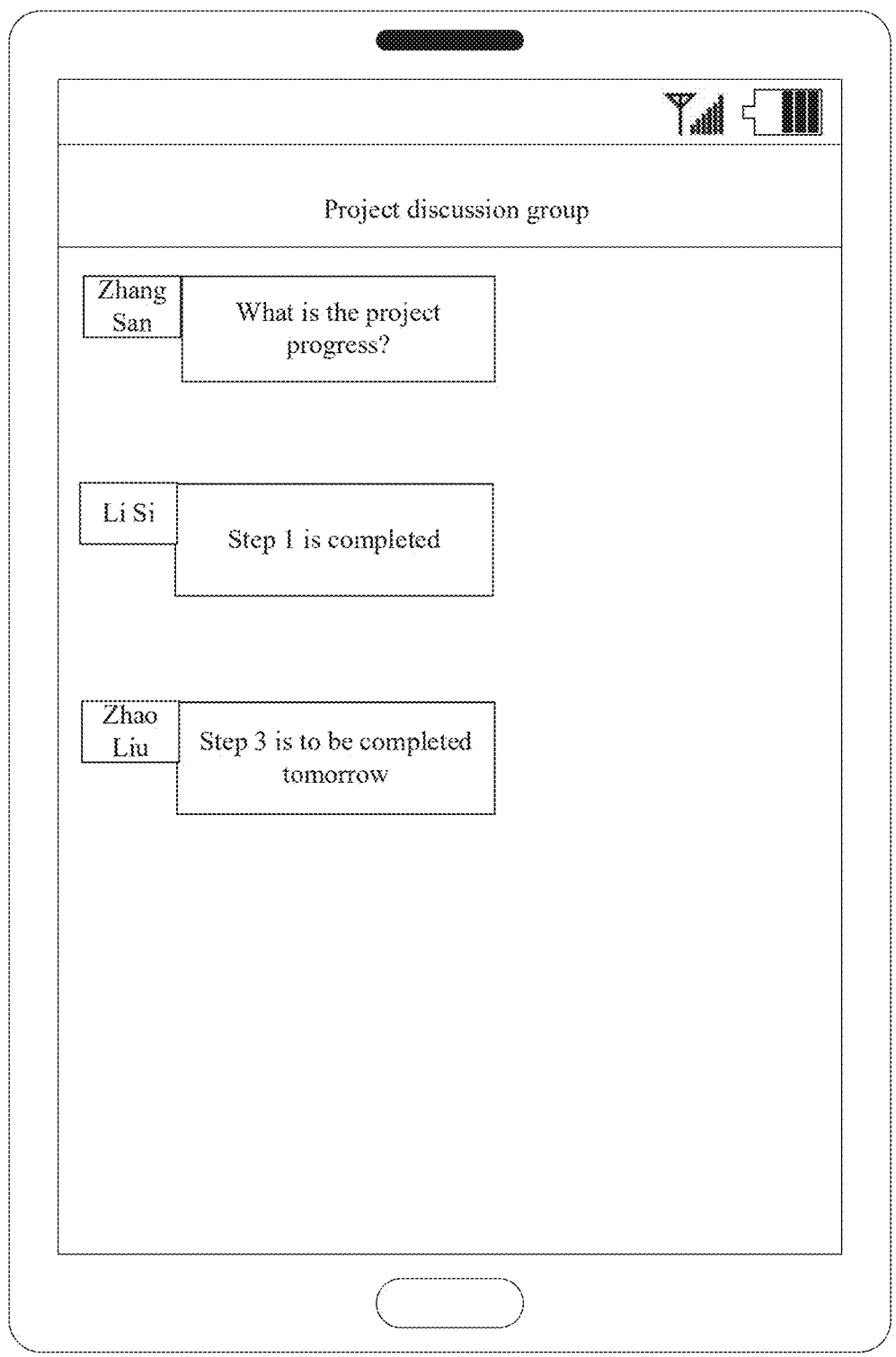
FIG. 5 is a schematic diagram of another application scenario of an information interaction method according to the present disclosure.

FIG. 5 shows that the message on the second service interface has been sent to the first service interface, but the first feedback information inputted in the first service interface has not been received. In this case, if the second service interface receives the message "Step 3 will be completed tomorrow" from Zhao Liu, the second display area of the first service interface can display the third update information "Step 3 will be completed tomorrow".

It should be noted that after the second service interface sends the second service data to the first service interface, if the second service interface receives a new message, the new message is sent to the first service interface, which can achieve timely synchronization of the updated second service data to the first service interface.

In some embodiments, the method further includes: determining a selected object from the second service data displayed on the second service interface; and generating index information.

Here, the index information indicates the first information identifier of the selected object. The index information may be generated based on the first information identifier and is different from the first information identifier.

It should be noted that the index information is generated based on the identification information. Instead of the identification information, the index information is transmitted to user devices, which can prevent reverse engineering based on the identification information and improve information security. The above index information may point to the information identifier or the storage space of the information identifier, so that the information identifier is obtained from the storage space, thereby obtaining the information data identified by the information identifier.

The step 102 may include displaying the selected object indicated by the index information in the second display area of the first service interface in response to receiving the index information on the first service interface.

Here, the selected object can be all or part of the information displayed on the second service interface.

In some application scenarios, a part of information of a conversation may be conversation messages. A part of information of a document may be a part of the document (such as a word, a sentence, or a paragraph). A part of information of an email may be a part of email content, such as the email body or email title, or a word, a sentence, or a paragraph in the email body.

Here, in this embodiment, the first service interface may receive the index information in various forms.

For example, a user may paste index information copied from the second service interface into the first service interface.

For another example, a user may select a part of the information in the second service interface, and then select a sharing target (such as a social group "lunch group"), so as to send the index information of the selected part of the information to the sharing target, and the first service interface that displays the sharing target can receive the index information.

In some application scenarios, the index information may be sent to a first electronic device. The first electronic device sends an information acquisition request to a second service server. The second service server determines the information identifier corresponding to the index information, and obtains the information (i.e., the selected object) from the part of information data indicated by the information identifier.

It should be noted that by providing a selection control in the second service interface to determine the selected object, the information of the second service can be shared to the first service interface. Therefore, the second service data can be displayed in the first service interface, avoiding jumping to the second service interface to obtain partial information and/or related information, thereby saving the steps of jumping to the second service interface, reducing the difficulty of information display, and reducing the resources used by information display.

In some embodiments, the first service interface includes a document interface, and the second service interface includes a conversation interface of instant messaging.

In some embodiments, the step 102 may include displaying a conversation message of instant messaging in the second display area of the document interface.

FIG. 2B shows that conversation messages of instant messaging are displayed in a second display area of a document.

It should be noted that sharing and displaying the conversation messages of instant messaging to the online document can achieve cross-service information sharing, allowing users to know context of the conversation from the document, and update the conversation interface of instant messaging with the feedback information based on the context. In this way, feedback information generated when the users using the online document can be quickly shared to the conversation interface of instant messaging, avoiding switching between two service interfaces and improving work efficiency.

In some embodiments, the method further includes: displaying, in the second display area of the document interface, the second feedback information received on the conversation interface for the first feedback information, in response to displaying the first feedback information on the conversation interface.

FIG. 4 shows that the first feedback information is displayed in the conversation interface, and if the second feedback information for the first feedback information is received in the conversation interface, the second feedback information is sent to the document interface, so that the document interface displays the second feedback information.

It should be noted that, by updating the first service interface with the second feedback information for the first feedback information, the new message highly related to the conversation messages shared in the document can be actively used to update the document, achieving targeted interaction between the instant messaging service and the document service, thereby improving the security of data in the instant messaging interface while maintaining the information interaction.

Figure 6:
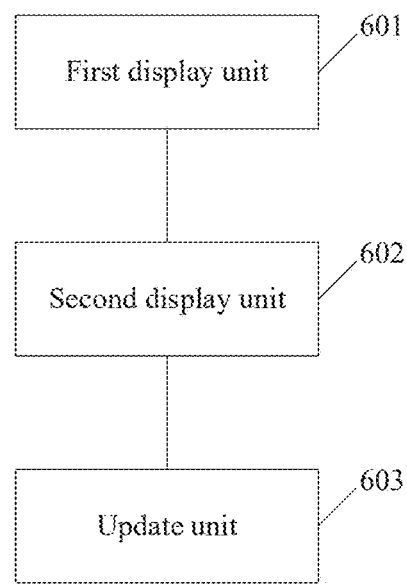
FIG. 6 is a structural schematic diagram of an information interaction apparatus according to an embodiment of the present disclosure.

Further referring to FIG. 6, as implementations of the methods shown in the above figures, an embodiment of an information interaction device is provided, which corresponds to the method embodiment shown in FIG. 1. The device can be applied to various electronic devices.

As shown in FIG. 6, the information interaction device of this embodiment includes: a first display unit 601, a second display unit 601, and an update unit 603. The first display unit is configured to display first service data in a first display area of a first service interface. The second display unit is configured to display second service data in a second display area of the first service interface, where the second service data is data related to a second service and displayed on a second service interface. The update unit is configured to update, in response to receiving first feedback information with respect to the second service data displayed in the second display area via the first service interface, updating the second service interface based on the first feedback information received via the first service interface.

In this embodiment, the specific processing and the technical effects of the first display unit 601, the second display unit 601, and the update unit 603 of the information interaction device are similar to those of steps 101, 102, and 103 in the corresponding embodiment of FIG. 1, and will not be repeated here.

In some embodiments, the apparatus is also configured to display the first feedback information in the second display area.

In some embodiments, the apparatus is also configured to receive the first feedback information in the second display area.

In some embodiments, a first information identifier is used to identify the second service data displayed in the second display area, and the apparatus is also configured to send the first feedback information to a server, where the server stores, in an associated manner, the received first feedback information as the second service data and the first information identifier.

In some embodiments, the first feedback information comprises first type information, the first type information is main information in the second service; and the server stores in an associated manner the first information identifier and a second information identifier identifying the first type information in response to receiving the first type information.

In some embodiments, the first feedback information comprises second type information, the second type information is additional information to the main information in the second service, and the server stores, in response to receiving the second type information, the second type information in a storage space corresponding to the first information identifier.

In some embodiments, the additional information includes at least one of: comments and a replied emoji. An emoji can come in at least one of the following forms: text, images, gif files, or a combination of the above.

In some embodiments, the apparatus is further configured to display, in response to displaying the first feedback information on the second service interface and in response to receiving first update information on the second service interface, the first update information received on the second service interface in the second display area of the first service interface.

In some embodiments, the apparatus is further configured to display, in response to displaying the first feedback information on the second service interface and in response to receiving second update information for the first feedback information on the second service interface, the second update information for the first feedback information received on the second service interface in the second display area of the first service interface.

In some embodiments, the apparatus is further configured to display, in response to receiving third update information on the second service interface, the third update information received on the second service interface in the second display area of the first service interface.

In some embodiments, the apparatus is further configured to determine a selected object from the second service data displayed on the second service interface; generate index information, where the index information indicates a first information identifier of the selected object. The displaying the second service data in the second display area of the first service interface includes: displaying, in the second display area of the first service interface, the selected object indicated by the index information in response to receiving the index information on the first service interface.

In some embodiments, the first service interface includes a document interface, and the second service interface includes a conversation interface of instant messaging. The displaying the second service data in the second display area of the first service interface includes including displaying a conversation message of instant messaging in the second display area of the document interface.

In some embodiments, the apparatus is further configured to display, in the second display area of the document interface, second feedback information received on the conversation interface for the first feedback information in response to displaying the first feedback information on the conversation interface.

Figure 7:
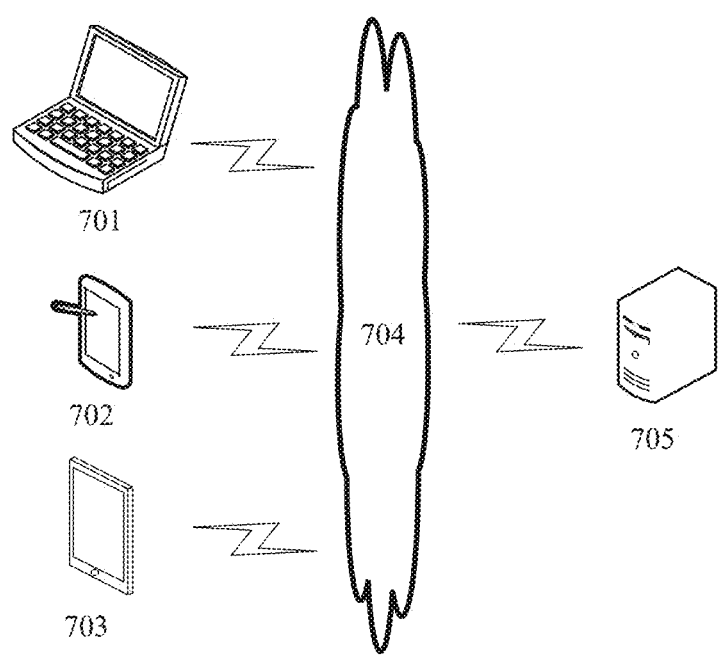
FIG. 7 is an exemplary system architecture for applying an information interaction method according to an embodiment of the present disclosure.

Reference is made to FIG. 7, which illustrates exemplary system architecture for applying the information interaction method according to an embodiment of the present disclosure.

As shown in FIG. 7, the system architecture may include terminal devices 701, 702 and 703, a network 704, and a server 705. The network 704 is a medium used to provide communication links between the terminal devices 701, 702 and 703 and the server 705. The network 704 may include various types of connection, such as wired or wireless communication links, fiber optic cables, and the like.

The terminal devices 701, 702 and 703 can communication with the server 705 through the network 704 to receive or send messages, etc. The terminal devices 701, 702 and 703 may be installed with various client applications, such as web browser applications, search applications, and news and information applications. The client applications in the terminal devices 701, 702 and 703 can receive user instructions and complete corresponding functions according to the user instructions, such as adding information according to the user instructions.

The terminal devices 701, 702, and 703 may be in form of hardware or software. When the terminal devices 701, 702 and 703 are in form of hardware, they may be various electronic devices having display screens and supporting web browsing, including but not limited to smartphones, tablets, e-book readers, MP3 (Moving Picture Experts Group Audio Layer III) players, MP4 (Moving Picture Experts Group Audio Layer IV) players, laptop and desktop computers. When the terminal devices 701, 702 and 703 are in form of software, they can be installed in the electronic devices listed above, and may be implemented as multiple software or software modules (such as software or software modules used to provide distributed services), or as a single software or software module, which is not limited herein.

The server 705 may be a server that provides various services, such as receiving information acquisition requests sent by the terminal devices 701, 702 and 703, obtaining display information corresponding to the information acquisition requests through various methods, and sending data of the display information to the terminal devices 701, 702 and 703.

It should be noted that the information interaction methods provided in the disclosed embodiments may be executed by the terminal device, and accordingly, the information interaction apparatus may be arranged in the terminal devices 701, 702, and 703. In addition, the information interaction methods provided in the embodiments may be executed by the server 705, and accordingly, the information interaction apparatus may be arranged in the server 705.

It should be understood that the numbers of the terminal devices, networks, and servers in FIG. 7 are only illustrative. The numbers of the terminal devices, networks, and servers can be configured according to actual requirements.

Figure 8:
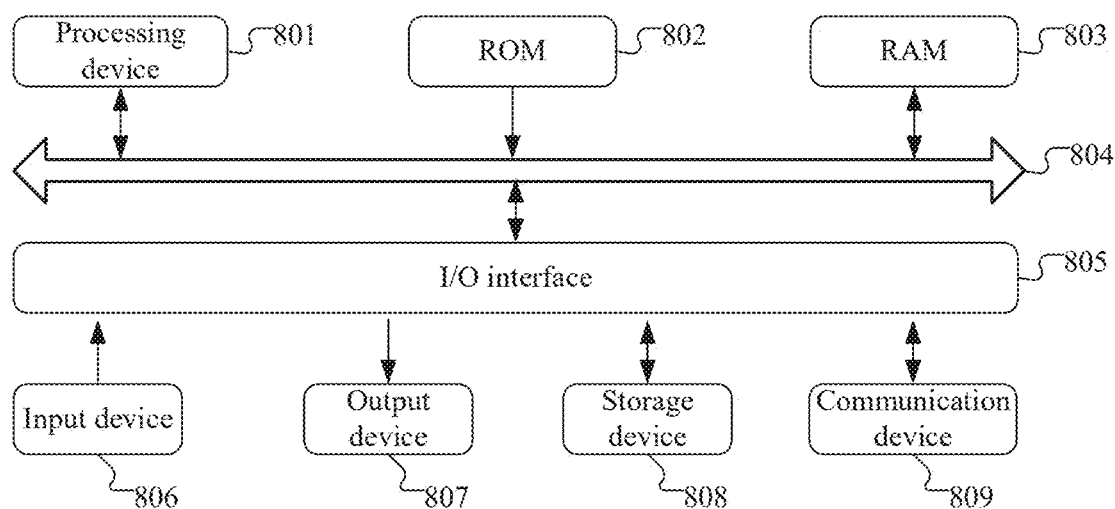
FIG. 8 is a schematic structural diagram of an electronic device according to an embodiment of the present disclosure.

Reference is made to FIG. 8, which is a schematic structural diagram of an electronic device (for example, the terminal devices or server in FIG. 7) according to an embodiment of the present disclosure. The terminal devices in the embodiments of the present disclosure may include but not limited to mobile terminals such as mobile phones, notebook computers, digital broadcast receivers, PDAs (personal digital assistants), PADs (tablet computers), PMPs (portable multimedia players) and vehicle terminals (such as car navigation terminals); and fixed terminals such as digital TVs and desktop computers. The electronic device shown in FIG. 8 is only an example, and should not limit the functions and application scope of the embodiments of the present disclosure.

As shown in FIG. 8, the electronic device may include a processing device (such as a central processing unit and a graphics processing unit) 801. The processing device 801 can execute various appropriate actions and processes according to programs stored in a read only memory (ROM) 802 or loaded from a storage device 808 into a random-access memory (RAM) 803. In the RAM 803, various programs and data necessary for the operation of the electronic device 800 are also stored. The processing device 801, the ROM 802 and the RAM 803 are connected to each other through a bus 804. An input/output (I/O) interface 805 is also connected to the bus 804.

Generally, the following devices may be connected to the I/O interface 805: input devices 806 including, for example, a touch screen, a touch pad, a keyboard, a mouse, a camera, a microphone, an accelerometer, a gyroscope, etc.; output devices 807 including, for example, a liquid crystal display (LCD), a speaker, a vibrator, etc.; a storage device 808 including, for example, a magnetic tape, a hard disk, etc.; and a communication device 809. The communication device 809 may allow the electronic device 800 to perform wireless or wired communication with other devices to exchange data. Although FIG. 8 shows the electronic device having various means, it should be understood that implementing or having all of the devices shown is not a requirement. More or fewer devices may alternatively be implemented or provided.

In particular, according to an embodiment of the present disclosure, the processes described above with reference to the flowcharts may be implemented as computer software programs. For example, embodiments of the present disclosure provide a computer program product. The computer program product includes a computer program carried on a non-transitory computer-readable medium. The computer program contains program code for carrying out the methods shown in the flowcharts. In such an embodiment, the computer program may be downloaded and installed from a network via the communication device 809, or from the storage device 808, or from the ROM 802. When the computer program is executed by the processing device 801, the functions defined in the methods of the embodiments of the present disclosure are performed.

It should be noted that the above computer-readable medium in the present disclosure may be a computer-readable signal medium or a computer-readable storage medium or any combination of the above two. The computer readable storage medium may be, for example, but not limited to, an electrical, magnetic, optical, electromagnetic, infrared, or semiconductor system, apparatus, or device, or any combination thereof. More specific examples of the computer-readable storage medium may include, but are not limited to: electrical connections with one or more wires, portable computer disks, hard disks, a random-access memory (RAM), a read only memory (ROM), an erasable programmable read-only memory (EPROM or Flash), optical fibers, a compact disk read-only memory (CD-ROM), optical storage devices, magnetic memory components, or any suitable combination of the above. In the present disclosure, the computer-readable storage medium may be any tangible medium that contains or stores a program. The program may be used by or in conjunction with the instruction execution system, apparatus or device. In the present disclosure, however, the computer-readable signal medium may include a data signal propagated in baseband or as part of a carrier wave, and the data signal carries computer-readable program code. Such propagated data signals may be in various forms, including but not limited to electromagnetic signals, optical signals, or any suitable combination of the foregoing. The computer-readable signal medium may also be any computer-readable medium other than the computer-readable storage medium. The computer-readable signal medium may transmit, propagate, or transport a program for use by or in connection with an instruction execution system, apparatus, or device. Program code embodied on the computer-readable medium may be transmitted by any appropriate medium, including but not limited to: wires, optical cables, RF (radio frequency), etc., or any suitable combination of the above.

In some embodiments, a client may communicate with a server using any currently known or future-developed network protocols such as HTTP (Hypertext Transfer Protocol), and the client and the server may be interconnected with digital data communication of any form or medium (e.g., a communication network). Examples of the communication network include local area networks ("LANs"), wide area networks ("WANs"), internetworks (e.g., the Internet), peer-to-peer networks (e.g., ad hoc peer-to-peer networks), as well as any currently known or future developed network.

The computer-readable medium may be included in the electronic device, or may exist independently without being incorporated into the electronic device.

The computer-readable medium carries one or more programs, when being executed by the electronic device, causes the electronic device to perform operations of: displaying first service data in a first display area of a first service interface; displaying second service data in a second display area of the first service interface, wherein the second service data is data related to a second service and displayed on a second service interface; and updating, in response to receiving first feedback information with respect to the second service data displayed in the second display area via the first service interface, updating the second service interface based on the first feedback information received via the first service interface.

The computer program code for carrying out operations of the present disclosure may be written in one or more programming languages, or a combination thereof. Such programming languages include, but are not limited to, object-oriented programming languages such as Java, Smalltalk, C++, and conventional procedural programming languages such as the "C" language or similar programming languages. The program code may be executed entirely on the user computer, partly on the user computer, as a stand-alone software package, partly on the user computer and partly on a remote computer or entirely on a remote computer or server. Where a remote computer is involved, the remote computer may be connected to the user computer through any kind of network including a local area network (LAN) or a wide area network (WAN), or may be connected to an external computer (e.g., via the Internet by an Internet service provider).

The flowcharts and block diagrams in the drawings illustrate the architecture, functionality, and operation of possible implementations of systems, methods and computer program products according to various embodiments of the present disclosure. In this regard, each block in the flowchart or block diagram may represent a module, program segment, or portion of code. The module, program segment, or portion of code contains one or more executable instructions for implementing specified logical functions. It should also be noted that, in some alternative implementations, the functions noted in the block may occur in an order different form the order noted in the drawings. For example, two blocks shown in succession could, in fact, be executed substantially concurrently or in reverse order, depending upon the functionality involved. Further, each block in the block diagrams and/or flow charts, and a combination of blocks in the block diagrams and/or flow diagrams may be performed by a dedicated hardware-based system that performs the specified functions or operations or by a combination of dedicated hardware and computer instructions.

The units involved in the embodiments described in the present disclosure may be implemented by software or by hardware. The name of a unit does not in any way constitute a qualification of the unit itself. For example, the first display unit may be named as "a unit for displaying first service data".

The functions described herein may be performed at least in part by one or more hardware logic components. For example, without limitation, exemplary types of hardware logic components that may be used include: field programmable gate arrays (FPGAs), application specific integrated circuits (ASICs), application specific standard products (ASSPs), system on chips (SOCs), complex programmable logical devices (CPLDs), etc.

In the context of the present disclosure, the machine-readable medium may be a tangible medium that may contain or store a program for use by or in conjunction with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of the machine-readable storage medium may include one or more wire-based electrical connections, portable computer disks, hard disks, a random-access memory (RAM), a read only memory (ROM), an erasable programmable read only memory (EPROM or flash memory), fiber optics, a compact disk read-only memory (CD-ROM), optical storage devices, magnetic storage devices, or any suitable combination of the foregoing.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

In addition, although the operations are described in a specific order, it should not be understood that these operations are to be performed in the specific order shown or performed in a sequential order. Under certain circumstances, multitasking and parallel processing may be advantageous. Although the specific implementation details are described above, these implementation details should not be construed as limiting the scope of the present disclosure. The features described in multiple separate embodiments may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims.

The invention claimed is:

1. An information interaction method, comprising:
displaying first service data in a first display area of a first service interface on a terminal device, wherein the first service data is data related to a first service, wherein the first service is served by an online document application, and wherein the first service interface is an online document interface configured to display an online document associated with a project;
displaying second service data in a second display area of the first service interface, wherein the second service data is data related to a second service, and wherein the second service is different from the first service;
displaying the second service data on a second service interface of the same terminal device, wherein the second service is served by an instant messaging application, wherein the second service interface is different and separate from the first service interface, and wherein the second service interface is a group conversation interface configured to display messages communicated among a group of members of the project;
receiving first feedback on the project via the second display area of the first service interface in which the messages communicated among the group of members of the project are displayed, wherein the first feedback is input by a member among the group of members of the project; and updating the second service interface of the same terminal device that is separate from the first service interface based on the first feedback received via the second display area of the first service interface, wherein the updating the second service interface comprises:

displaying, on the second service interface that is separate from the first service interface, the first feedback input by the member of the project in the second display area of the first service interface.

2. The method according to claim 1, further comprising: displaying the first feedback in the second display area.

3. The method according to claim 1, wherein a first information identifier indicating the second service data displayed in the second display area; and wherein the method further comprises:

sending the first feedback to a server, wherein the server stores a second service data based on the received first feedback and an association between the second service data based on the received first feedback and the first information identifier.

4. The method according to claim 3, wherein the first feedback comprises first type information, the first type information is main information in the second service; and the server stores an association between the first information identifier and a second information identifier identifying the first type information in response to receiving the first type information.

5. The method according to claim 3, wherein the first feedback comprises second type information, the second type information is additional information to the main information in the second service; and the server stores, in response to receiving the second type information, the second type information in a storage space corresponding to the first information identifier.

6. The method according to claim 5, wherein the additional information comprises at least one of: a comment, a replied emoji.

7. The method according to claim 1, further comprising: displaying, in response to displaying the first feedback on the second service interface and in response to receiving first update information on the second service interface, the first update information received on the second service interface in the second display area of the first service interface.

8. The method according to claim 1, further comprising: displaying, in response to displaying the first feedback on the second service interface and in response to receiving second update information for the first feedback on the second service interface, the second update information for the first feedback received on the second service interface in the second display area of the first service interface.

9. The method according to claim 1, further comprising: displaying, in response to receiving third update information on the second service interface, the third update information received on the second service interface in the second display area of the first service interface.

10. The method according to claim 1, further comprising: determining a selected object from the second service data displayed on the second service interface;

generating index information, wherein the index information indicates a first information identifier of the selected object; and the displaying the second service data in the second display area of the first service interface comprises:

displaying, in the second display area of the first service interface, the selected object indicated by the index information in response to receiving the index information on the first service interface.

11. The method according to claim 1, wherein the displaying the second service data in the second display area of the first service interface comprises:

displaying a conversation message of instant messaging in the second display area of the document interface.

12. The method according to claim 11, further comprising:

displaying, in the second display area of the document interface, second feedback information received on the conversation interface for the first feedback in response to displaying the first feedback on the conversation interface.

13. An information interaction apparatus, comprising:
at least one processor; and
at least one memory communicatively coupled to the at least one processor and storing instructions that upon execution by the at least one processor cause the apparatus to:

display first service data in a first display area of a first service interface on a terminal device, wherein the first service data is data related to a first service, wherein the first service is served by an online document application, and wherein the first service interface is an online document interface configured to display an online document associated with a project;

display second service data in a second display area of the first service interface, wherein the second service data is data related to a second service, and wherein the second service is different from the first service;

display the second service data on a second service interface of the same terminal device, wherein the second service is served by an instant messaging application, wherein the second service interface is different and separate from the first service interface, and wherein the second service interface is a group conversation interface configured to display messages communicated among a group of members of the project;

receive first feedback on the project via the second display area of the first service interface in which the messages communicated among the group of members of the project are displayed, wherein the first feedback is input by a member among the group of members of the project; and update the second service interface of the same terminal device that is separate from the first service interface based on the first feedback received via the second display area of the first service interface, wherein updating the second service interface comprises:

displaying, on the second service interface that is separate from the first service interface, the first feedback input by the member of the project in the second display area of the first service interface.

14. A non-transitory computer-readable storage medium storing a computer program, bearing computer-readable instructions that upon execution on a computing device cause the computing device at least to:

display first service data in a first display area of a first service interface on a terminal device, wherein the first service data is data related to a first service, wherein the first service is served by an online document application, and wherein the first service interface is an online document interface configured to display an online document associated with a project;

display second service data in a second display area of the first service interface, wherein the second service data is data related to a second service, and wherein the second service is different from the first service;

display the second service data on a second service interface of the same terminal device, wherein the second service is served by an instant messaging application, wherein the second service interface is different and separate from the first service interface, and wherein the second service interface is a group conversation interface configured to display messages communicated among a group of members of the project;

receive first feedback on the project via the second display area of the first service interface in which the messages communicated among the group of members of the project are displayed, wherein the first feedback is input by a member among the group of members of the project; and update the second service interface of the same terminal device that is separate from the first service interface based on the first feedback received via the second display area of the first service interface, wherein updating the second service interface comprises:

displaying, on the second service interface that is separate from the first service interface, the first feedback input by the member of the project in the second display area of the first service interface.

15. The apparatus of claim 13, the at least one memory further storing instructions that upon execution by the at least one processor cause the apparatus to:
display the first feedback in the second display area.

16. The apparatus of claim 13, the at least one memory further storing instructions that upon execution by the at least one processor cause the apparatus to:
send the first feedback to a server, wherein the server stores, in an associated manner, the received first feedback as the second service data and the first information identifier.

* * * * *